United States Patent [19]

Sethares et al.

[11] 4,126,047
[45] Nov. 21, 1978

[54] SURFACE ACOUSTIC WAVE RATE SENSOR AND POSITION INDICATOR

[75] Inventors: James C. Sethares, Burlington, Mass.; Harold M. Frost, Rockville, Md.

[73] Assignee: The United States of America as represented by the Secretary of the Air Force, Washington, D.C.

[21] Appl. No.: 790,774

[22] Filed: Apr. 25, 1977

[51] Int. Cl.$^2$ ............................................. G01P 3/44
[52] U.S. Cl. ........................................ 73/505; 73/518
[58] Field of Search ................ 73/505, 518; 324/160, 324/166, 173, 174, 83 A

[56] References Cited

U.S. PATENT DOCUMENTS

| | | | |
|---|---|---|---|
| 3,307,409 | 3/1967 | Newton, Jr. | 73/505 |
| 3,395,270 | 7/1968 | Speller | 73/505 X |
| 3,905,235 | 9/1975 | Shaw | 73/518 X |
| 3,910,373 | 10/1975 | Newburgh et al. | 73/505 |

OTHER PUBLICATIONS

"Rotation Sensing through Electromagnetic-Surface-Acoustic-Wave Transduction" by Frost et al., Journal of Applied Physics pp. 52–58, Jan. 1977.

Primary Examiner—James J. Gill
Attorney, Agent, or Firm—Joseph E. Rusz; Willard R. Matthews, Jr.

[57] ABSTRACT

Extremely sensitive velocity and position measurements are achieved with a surface acoustic wave (SAW) resonator device. A surface acoustic standing wave field is established on a movable SAW propagation surface by means of induced SAW pulses traveling on the propagation surface and their reflection from a SAW reflecting mechanism. Movement of the propagation surface causes periodic variations in the standing wave field amplitude. The frequency of the standing wave field amplitude variation is directly related to the SAW propagation surface velocity and its phase (i.e., total number of standing wave field amplitude variations from a reference point) indicates the SAW propagation surface position or how far it has moved from the reference point.

One implementation comprises a rotatable aluminum cylinder on the surface of which SAWs are launched and detected by proximate but non-contacting transmitting and receiving electromagnetic transducers (EMTs). The reflecting mechanism used to initiate the standing wave results from the proximity of the EMTs and the coupling effect of the EMT magnetic fields. Frequency and phase information is extracted from the receiving transducer output by visually (CRT) or electronically counting standing wave amplitude variation cycles.

Other implementation includes translatory planar SAW propagating surfaces and various transducer configurations and arrangements.

10 Claims, 17 Drawing Figures

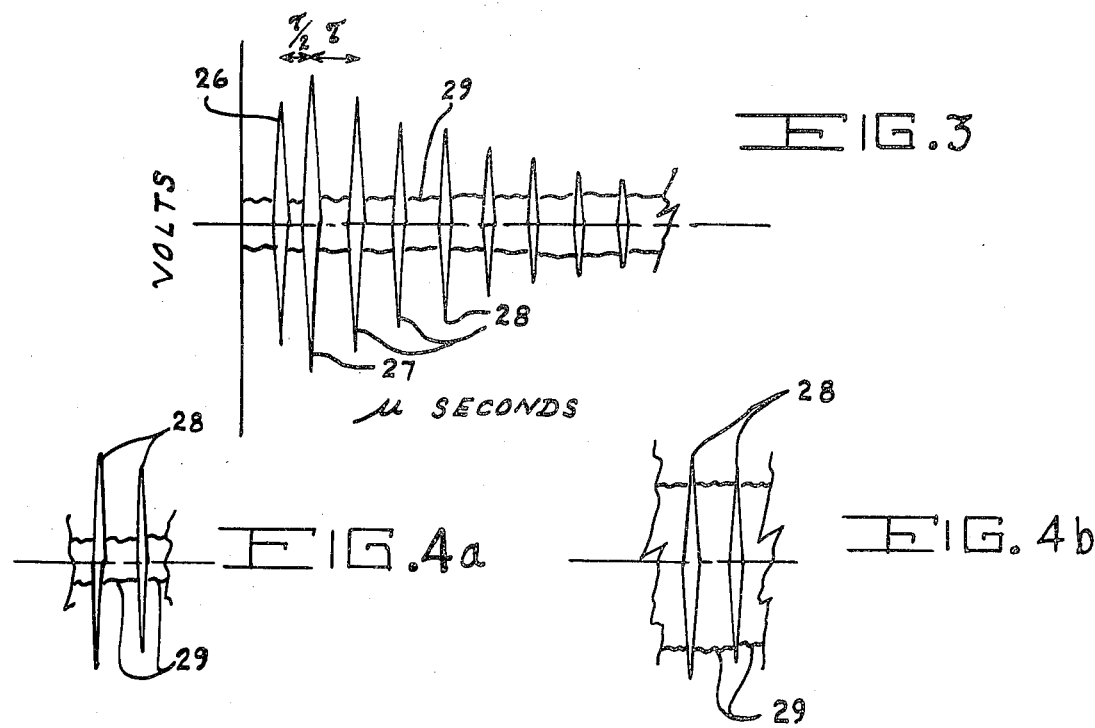
FIG. 3
FIG. 4a
FIG. 4b
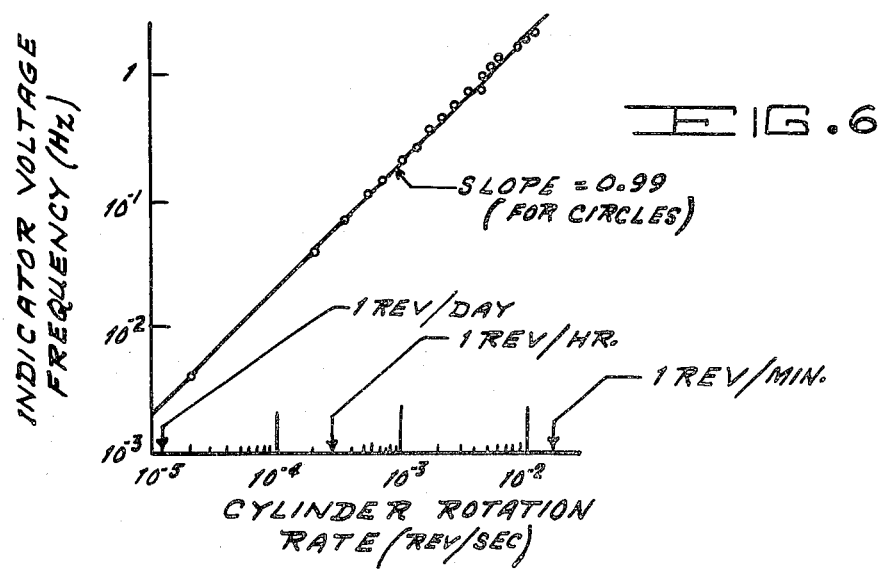
FIG. 6
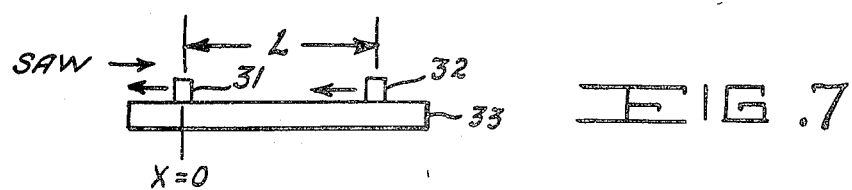
FIG. 7

FIG. 8
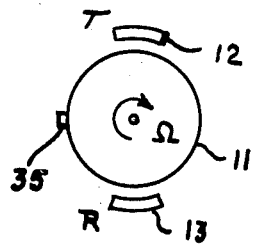
FIG. 9
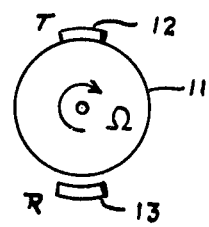
FIG. 10
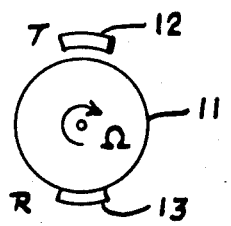
FIG. 11
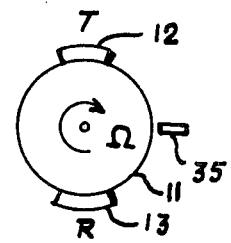
FIG. 12
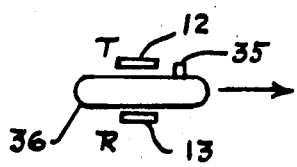
FIG. 13
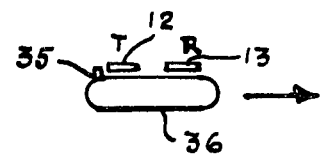
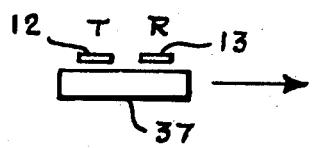
FIG. 14
FIG. 15

SURFACE ACOUSTIC WAVE RATE SENSOR AND POSITION INDICATOR

STATEMENT OF GOVERNMENT INTEREST

The invention described herein may be manufactured and used by or for the Government for governmental purposes without the payment of any royalty thereon.

BACKGROUND OF THE INVENTION

The invention relates to surface acoustic wave devices, and in particular to an electromagnetic SAW resonator utilized as a rate sensor and position indicator.

Rotation rate sensing through contactless transduction of circulating acoustic and magnetostatic surface waves on a rotating cylindrical surface has been discussed in prior art literature. U.S. Pat. No. 3,909,710 issued Sept. 30, 1975 to Ronald Newburgh et al., entitled *Magnetic Surface Wave Rotation Rate Sensor Using the Sagnac Effect* discloses a typical device. In the method involved, a cylinder is mounted separately from and rotated with respect to a single transducer. The velocities of the corresponding circulating clockwise (CW) and counterclockwise (CCW) waves launched on the rotating cylinder are unequal in the laboratory frame. Phase differences proportional to rotation rate then develop between these waves when they recombine at the transducer site. However, state-of-the-art acoustic devices based on magnetostatic and piezoelectric transducers operating at frequencies much higher than a megahertz involve transducer-cylinder alignment difficulties and impose critical transducer-propagation surface gap requirements.

Other available rotation rate sensors such as the ring laser measure rate only, are complex, expensive, and have rate sensitivities of no better than ⅛°/hour.

There currently exists, therefore, the need for a SAW motion sensing device that measures both rate and position and that is more easily fabricated, less expensive, and has better sensitivity than existing devices. The present invention is directed toward satisfying that need.

SUMMARY OF THE INVENTION

The invention is a dual beam interferometer that acoustically senses both position and velocity. It has three basic parts: a propagation surface for acoustic surface waves (SAWs), a transducer setup for launching and detecting SAWs, and a means for causing acoustic reflections on the surface. The propagating surface rotates or translates relative to one or more of the transducers. The reflections are the type which lead to a standing wave field that is effectively fixed on the moving propagation surface. Receiver transducer sampling of this field produces a time-varying indicator signal whose phase measures position and rate of phase change, i.e., frequency, measures velocity of the propagation surface. In one presently preferred embodiment of this invention, both a transmitter and a receiver electromagnetic SAW transducer (EMT) are mounted conformally but not quite in contact with a rotating aluminum cylinder (the propagation surface) in the presence of a static magnetic field. Rotation rates are measured by counting the cycles of the time varying indicator signal as it is displayed on the scope of CRT.

It is the principal object of the invention to provide a new and improved surface acoustic wave rate sensor and position indicator.

It is another object of the invention to provide an acoustic motion sensing device that has better sensitivity than ring lasers and other acoustic rate sensors.

It is another object of the invention to provide an acoustic motion sensing device that measures both rate and position.

It is another object of the invention to provide an acoustic surface wave rate sensor and position indicator that is easier to fabricate and less expensive than currently available rate sensing devices.

These, together with other objects, features and advantages of the invention will become more readily apparent from the following detailed description when taken in conjunction with the illustrative embodiments in the accompanying drawings.

DESCRIPTION OF THE DRAWINGS

FIG. 3 is a representation of an oscilloscope trace of the sensor receiver signals;

FIGS. 4a and 4b illustrate the minimum and maximum amplitudes respectively for one cycle of the standing wave field amplitude variation;

FIG. 6 is a graph of mini-pulse frequency versus sensor cylinder rotation rate;

FIG. 7 is a schematic representation of an alternative embodiment of the sensor element of the invention;

FIGS. 8, 9, 10, and 11 illustrate various transmitter, receiver and reflector arrangements on cylindrical SAW surfaces; and FIGS. 12, 13, 14 and 15 illustrate various transmitter, receiver and reflector arrangements on translating planar SAW surfaces.

DETAILED DESCRIPTION OF THE PREFERRED EMBODIMENT

Figure 1:
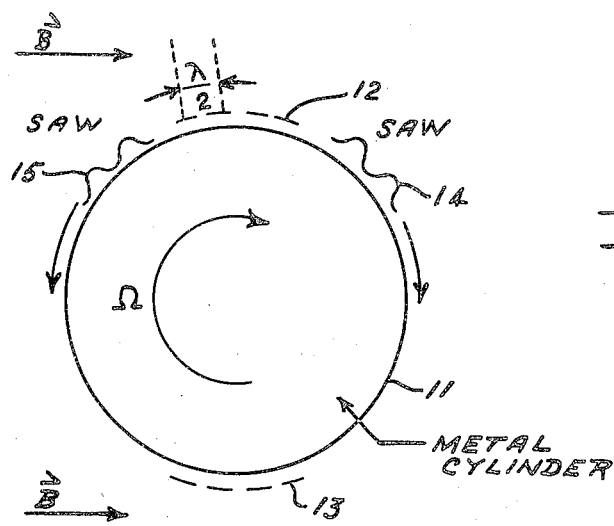
FIG. 1 is a schematic representation of one presently preferred embodiment of the rotation rate sensor of the invention.

A SAW resonator sensing element incorporating the principles of the invention is illustrated schematically by FIG. 1. By way of example, the structure of FIG. 1 and other sensor system components will hereinafter be described in terms of specific parameters. It is not intended to suggest, however, that practice of the invention be limited to such specifics.

Having reference now to FIG. 1, a 3-inch diameter aluminum cylinder 11 is mounted and rotatable on its major axis within an electromagnet (not shown). The peripheral surface of cylinder 11 comprises a movable SAW propagation surface. A receiving electromagnetic-SAW transducer (EMT) 13, capable of circumferential positioning, is mounted conformally below and just out of contact with cylinder 11. A transmitting EMT 12 is similarly mounted above the cylinder. The positioning capability permits precise circumferential adjustment of one EMT relative to the other. Both transducers are fabricated from commercially available multiconductor, flat cable. Each EMT consists of a meander pattern of conductors sandwiched by clear plastic insulation and mounted flush on a curved, plastic 'shoe'. These transducers can be fabricated in accordance with the teachings of the U.S. patent application of Harold M. Frost et al., Ser. No. 751,240, filed Dec. 16, 1976, entitled *Electromagnetic Ultrasound Transducer*.

In operation, 1.2 MHz toneburst of ~ 25 μsec duration is applied to transmitter EMT 12. This launches two SAWs, clockwise (CW) SAW 14, and counterclockwise (CCW) SAW 15, which after multiple round trips and reflections produce a standing wave component of SAWs that is fixed on the cylinder and detected by receiver EMT 13. A static magnetic field (B) of a few kilogauss is present at each transducer, as required for electromagnetic-SAW conversion.

The reflecting mechanism that causes reflection of the circulating SAWs to produce the standing wave component comprises the EMT transducers, their proximity to the SAW propagation surface and the coupling effect of the magnetic field.

Figure 2:
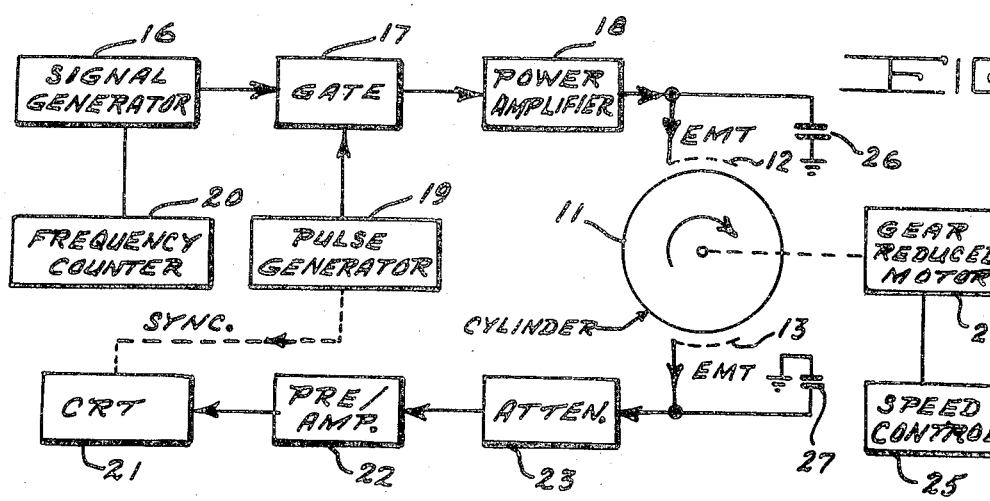
FIG. 2 is a block diagram of the complete sensor system.

A block diagram of the rotation setup showing the necessary electronics is shown in FIG. 2. The signal generator 16, gate 17, and pulse generator 19 deliver RF pulses to the transmitter EMT 12 through the power amplifier 18. The receiver EMT signal is preamplified by preamplifier 22 and displayed on a cathode ray tube (CRT) 21. Shunt capacitors 26, 27 at both EMTs provide impedance matching. Calibration of the device can be accomplished by visually counting the number of mini-signal (i.e., indicator voltages) or standing wave field oscillations occurring on the CRT and measuring the cylinder rotation angle, both over a given counting time. Rotation rates have been measured over about three orders of magnitude, i.e., from 2 rev/day to 1 rev/min. Electronic counting techniques can of course be used in place of the CRT to improve measurement sensitivity.

FIG. 3 represents an oscilloscope photograph of the receiver EMT signals. The first large pulse 26 is electromagnetic leakage corresponding to transmitter EMT excitation. The second large pulse 27 is the first acoustic arrival at the receiver, i.e., the sum of the two opposite propagating SAW pulses 14, 15 half-way around the cylinder. Subsequent large pulses 28 corresponding to summing of the complete round trip echo pairs are separated by a circulation time $\tau$ of 80 μsec. Between these pulses appear mini-pulses 29 whose amplitudes gradually build up to equal the decaying large pulse amplitudes. All pulses die out before the next transmitter excitation pulse. The mini-signals (or standing wave field envelopes) used to indicate rotation rate and position, are built up by reflections of SAWs on the cylinder. Reflections can be produced by any suitable reflector mechanism or by a number of processes, such as reconversion, scattering from mechanical discontinuities on or (in the case of concommitant bulk wave generation) beneath the surface. Reverberation of SAWs, as within reflection cavities, broadens the mini-pulses so that they 'fill in' the intervals between the large or main pulses. The reflection processes must be such, though, that the resulting standing wave component rotates with the cylinder as opposed to being fixed in the lab frame (in which the cylinder rotates).

Figure 5A:
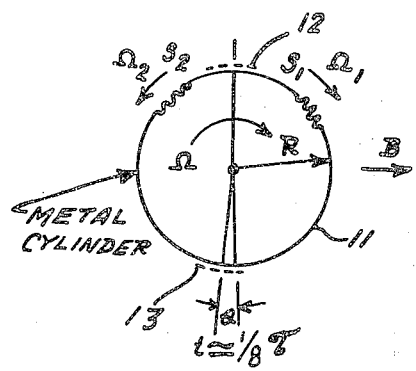
FIGS. 5a and 5b are simplified diagrams of the sensor input and output signals.
Figure 5B:
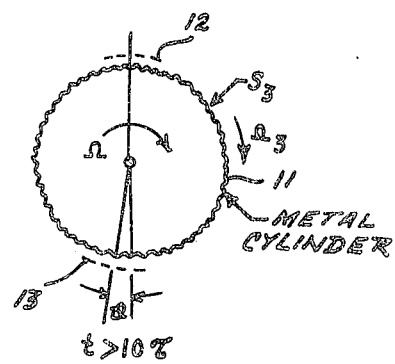

The generation of a rotating standing wave component is illustrated schematically in FIGS. 5a and 5b. At $t = 0$ the transmitter EMT 12 is pulsed. Waves $S_1$ and $S_2$ are launched (shown at $t \simeq \tau/8$ in FIG. 5a) and propagate with angular velocities in the lab frame of $\Omega_1$ and $\Omega_2$ ($-\Omega_2 \simeq \Omega_1 >> \Omega$ in this instance). These acoustic signals have spatial extent determined by the transducer widths and excitation pulse length, as well as by reflection geometries. At $t \simeq \tau/2$, $S_1$ and $S_2$ combine constructively (for opposite-sited EMTs) to produce the large pulses observed on the CRT. The net effect of multiple reflections occurring after many round trips is to produce a pseudo-standing wave $S_3$ (FIG. 5b) 'rotating' with angular velocity $\Omega_3 = \Omega$. Therefore when the cylinder rotates in the lab frame by an angle given by $\tan \theta = \lambda/(2R) \simeq \theta$ ($\lambda/R << 1$) with $\lambda$ the acoustic wavelength, the mini-pulse amplitude undergoes one complete cycle of oscillation. FIGS. 4a and 4b illustrate minimum and maximum conditions, respectively. The relationship between cylinder rotation rate $F_c = \Omega/(2\pi)$ (in rev/sec) and mini-signal oscillation frequency $f_i$ (in Hz) is $$f_i = (4\pi R/\lambda) F_c \qquad (1)$$

Measured values of $F_c$ and $f_i$ over three decades of $F_c$ yield $4\pi R/\lambda = 191.7$, which is within 1% of the calculated value of 189.7. Experimental reproducibility is also about 1 percent. A log-log plot of data of $f_i$ vs $F_c$ is given in FIG. 6. Sensor sensitivity can be compared to that expected from an acoustic Sagnac interferometer of the type disclosed by U.S. Pat. No. 3,909,710. A Sagnac sensor using a two transducer setup would measure a phase shift $\Delta \phi'$ given by $$\Delta \phi' = 8\pi^2 (2M + 1) \pi R^2 F_c/(\lambda c) \qquad (2)$$

while the sensor of the invention would give a shift $$\Delta \phi \text{ of} = 2\pi f_i \Delta t \qquad (3)$$

for counting or measuring time $\Delta t$ and number of acoustic circulations (after the first arrival) M.

The Sagnac shift $\Delta\phi^1$ is due to the relatively small splitting of the velocity C into two values C ± Ω R for the CW and CCW waves whereas the shift $\Delta\phi$ (of the present invention) is due effectively to the simple rotation of a standing wave.

Combining Equations (1)–(3) yields the sensitivity ratio $$\Delta\phi/\Delta\phi^1 = \Delta t/\Delta t^1 \qquad (4)$$

where $\Delta t^1 = (2M+1)\pi R/C$ is nearly equal to the SAW time delay for the Mth circulation pulse, if $F_c << C/R$ (an approximation well satisfied in the present case). Total propagation time $\Delta t^1$ is limited by acoustic losses such as absorption and diffraction but no such limitations are placed on $\Delta t$. In practice $\Delta t/\Delta t^1$ can be easily as large as $10^4$, as it is in the present case. It is the ability to use relatively long counting times which gives the sensor of the present invention its high sensitivity.

It has been shown that the model of a standing wave fixed on the cylinder is reasonable provided Ω is not too large, i.e., satisfies the inequality:

$$\Omega << C^2/\omega\pi R^2 (2M+1) = \Omega_{max} \qquad (5)$$

where $\omega$ is the angular frequency $\omega = 2\pi f$ of the RF toneburst. Substituting appropriate values into Equation (5), $c = 2.99 \times 10^5$ cm/sec, $f = 1.18$ MHz, $R = 3.81$ cm, and $M = 15$, it is seen that $\Omega_{max} = 82$ RPM. The maximum Ω of 1 rev/min thus satisfies the inequality quite well.

The invention also includes various other configurations and arrangements. For instance, one variation of the invention comprehends reflectors mounted on the cylinder or on a flat, or other propagation, surface to form a system of moving cavities whose acoustic resonant frequency measures velocity.

Consider, for example, the arrangement shown in FIG. 7. Two reflectors 31, 32 a distance L apart on the surface, of SAW translatory planar member 33. When SAWs are incident on one side ($x = 0$), then SAWs will reflect from that side, while other SAWs will be transmitted by the cavity at the opposite side ($X = L$). If L is an integral multiple of the half-wavelengths $\lambda/2$, then a standing wave will be established within the cavity. If the reflectors efficiently remove energy from the incident beam, the Q of the cavity will be quite high. The cavity bandwidth thus will be much smaller than the EMT bandwidth.

At $\Omega = 0$ the condition $L = m\lambda/2$ ($m$ an integer) exists and a perfectly tuned cavity results. With $\Omega > 0$, however, the cavity is effectively retuned (in the same way the ring laser is) because the effective cavity length L is shifted by an amount $\pm 2\Omega RL/(C \pm \Omega R)$ for the CW (+) and CCW (−) waves ($\Omega > 0$ assumed for CW rotation.) The cavity resonant frequency $f_r$ is then shifted approximately by the amount $\Delta f_r \simeq \pm 2\Omega R f_r / C = \pm 2\Omega R/\lambda$ ($\Omega R/C << 1$) for the two waves.

Assume (conservatively) an acoustic cavity Q of $10^3$ and thus with $f_r = 1$ MHz (at $\Omega = 0$) a bandwidth of 1 KHz. Assume also $\Omega/(2\pi) = 180$ rpm so that $f_r$ is shifted by ~ ½kHz. ($R = 3.81$ cm, $C = 3 \times 10^5$ cm/sec, still). If the excitation frequency $f$ is initially 1 MHz exactly, then the result of rotating the cylinder at 180 rpm is to detune the cavity by 3 db. This detuning could be detected by the receiver EMT in the time domain. By using a spectrum analyzer, the cavity frequency shift could also be measured directly in the frequency domain so that rotation rate could be found from the linear relation between the frequency shift and rotation rate given above.

The invention also comprehends a more general transducer arrangement other than an EMT receiver and an EMT transmitter both out of contact with the SAW propagation surface. For example, the various setups of FIGS. 8-11 all are suitable modifications of the above-described embodiment. FIG. 8 illustrates a sensor in which the transmitting and receiving transducers 12 and 13 are out of contact with the cylinder 11 and the reflector element 35 is fixed on the cylinder. The sensor arrangement of FIG. 9 has the transmitting transducer 12 mounted on the cylinder and the receiving transducer 13 is out of contact. The sensor of FIG. 10 has just the opposite arrangement. FIG. 11 shows a sensor in which both transmitting and receiving transducers are mounted on the cylinder and the reflector is out of contact in a fixed laboratory frame. The reflecting mechanism in FIGS. 9 and 10 is provided by the transducer that is fixed on the cylinder.

Other SAW supporting surfaces can also be employed. The propagation surface can be flat or otherwise different from cylindrical. FIGS. 12-15 illustrated typical devices. FIGS. 12 and 13 show planar members 36 that support circulating SAWs and have translatory motion while FIGS. 14 and 15 show translatory planar members 37 having SAW propagation on one surface only and no SAW circulation. In FIGS. 12, 13 and 15 a reflector such as transverse ridge 35 is employed and in FIG. 14 reflections are incurred from the corners of the planar member.

While the invention has been described in terms of its preferred embodiments, it is understood that the words which have been used are words of description rather than words of limitation and that changes within the purview of the appended claims may be made without departing from the scope and spirit of the invention in its broader aspects.

What is claimed is:

1. A surface acoustic wave rate sensor and position indicator comprising
   a movable member having a surface acoustic wave propagation surface,
   means for inducing surface acoustic waves on said propagation surface,
   surface acoustic wave reflector means adapted to establish a surface acoustic standing wave field in fixed position on said propagation surface, and
   detector means for detecting the frequency and phase relationship of surface acoustic standing wave field amplitude fluctuations, at least one of the group of elements consisting of said means for inducing surface acoustic waves, said surface acoustic wave reflector means and said detector means being in a fixed frame relative to said movable member.

2. A surface acoustic wave rate sensor and position indicator as defined in claim 1 wherein said means for inducing surface acoustic waves on said propagation surface comprises an electromagnetic wave signal generator in combination with an electromagnetic surface acoustic wave transmitting transducer and,
   said detector means comprises a receiving electromagnetic surface acoustic wave transducer in combination with means for extracting surface acoustic standing wave field amplitude fluctuation frequency and phase relationship values from received transducer output signals.

3. A surface acoustic wave rate sensor and position indicator as defined in claim 2 wherein said surface acoustic wave reflector means comprises a surface acoustic wave reflecting mechanism positioned in transverse relationship to surface acoustic waves propagating on said propagation surface.

4. A surface acoustic wave rate sensor and position indicator as defined in claim 3 wherein said transmitting transducer, said receiving transducer and said reflecting mechanism are in a fixed frame and said propagation surface is in movable relationship therewith.

5. A surface acoustic wave rate sensor and position indicator as defined in claim 3 wherein said transmitting transducer and said receiving transducer are in a fixed frame, said reflecting mechanism is affixed to said propagating surface, and said propagating surface is in movable relationship to said transmitting and receiving transducers.

6. A surface acoustic wave rate sensor and position indicator as defined in claim 3 wherein said receiving transducer is in a fixed frame, said transmitting transducer and said reflecting mechanism are affixed to said propagating surface and said propagating surface is in movable relationship to said receiving transducer.

7. A surface acoustic wave rate sensor and position indicator as defined in claim 3 wherein said transmitting transducer is in a fixed frame, said receiving transducer and said reflecting mechanism are affixed to said propagating surfacee and said propagating surface is in movable relationship to said transmitting transducer.

8. A surface acoustic wave rate sensor and position indicator as defined in claim 3 wherein said reflecting mechanism is in a fixed frame, said transmitting and receiving transducers are affixed to said propagating surface and said propagating surface is in movable relationship to said reflecting mechanism.

9. A surface acoustic wave rate sensor and position indicator as defined in claim 3 wherein said surface acoustic wave propagation surface comprises the peripheral surface of a rotatable cylinder.

10. A surface acoustic wave rate sensor and position indicator as defined in claim 3 wherein said surface acoustic wave propagation surface comprises at least one surface of a translatory planar member.